(12) United States Patent
Helinski et al.

(10) Patent No.: US 12,107,962 B1
(45) Date of Patent: Oct. 1, 2024

(54) BLOCKCHAIN BASED INTEGRATED CIRCUIT AUTHENTICATION

(71) Applicant: National Technology & Engineering Solutions of Sandia, LLC, Albuquerque, NM (US)

(72) Inventors: Ryan Helinski, Albuquerque, NM (US); Nicholas D. Pattengale, Albuquerque, NM (US); Todd Bauer, Albuquerque, NM (US)

(73) Assignee: National Technology & Engineering Solutions of Sandia, LLC, Albuquerque, NM (US)

( * ) Notice: Subject to any disclaimer, the term of this patent is extended or adjusted under 35 U.S.C. 154(b) by 370 days.

(21) Appl. No.: 17/380,183

(22) Filed: Jul. 20, 2021

Related U.S. Application Data

(60) Provisional application No. 63/073,060, filed on Sep. 1, 2020.

(51) Int. Cl.
  *H04L 9/32* (2006.01)
  *G06K 7/14* (2006.01)
  *G06K 19/06* (2006.01)
  *H04L 9/00* (2022.01)

(52) U.S. Cl.
  CPC .......... *H04L 9/3226* (2013.01); *G06K 7/1413* (2013.01); *G06K 7/1417* (2013.01); *G06K 19/06028* (2013.01); *G06K 19/06037* (2013.01); *H04L 9/3278* (2013.01); *H04L 9/50* (2022.05)

(58) Field of Classification Search
  CPC ....... H04L 9/3226; H04L 9/3278; H04L 9/50; G06K 7/1413; G06K 7/1417; G06K 19/06028; G06K 19/06037
  See application file for complete search history.

(56) References Cited

U.S. PATENT DOCUMENTS

| | | | |
|---|---|---|---|
| 11,557,011 B1* | 1/2023 | Wu | H04L 9/3236 |
| 2020/0082101 A1* | 3/2020 | Kim | G06F 21/73 |
| 2020/0151401 A1* | 5/2020 | Dyche, Jr. | G06Q 10/0833 |
| 2021/0303236 A1* | 9/2021 | Park | H04L 9/0643 |
| 2021/0377037 A1* | 12/2021 | Antonopoulos | H04L 9/3247 |
| 2022/0171951 A1* | 6/2022 | Vargas | G06K 7/10445 |

* cited by examiner

*Primary Examiner* — Mohammad W Reza
(74) *Attorney, Agent, or Firm* — Mark A. Dodd; Merle W. Richman

(57) ABSTRACT

An article, for example, an integrated circuit (IC), is manufactured such that the article includes an authentication element that is indicative of an authentication code associated with the article. A block of a blockchain ledger is generated based upon the authentication code. After the article leaves a trusted chain of custody, the article can be authenticated based upon the blockchain. An authentication code can be read from an authentication element included in or on an article under test that is of undetermined authenticity. The authentication code can be evaluated against the blockchain to determine if the authentication code is a genuine code used to generate a block of the blockchain. If the authentication code is genuine, the article under test can be authenticated.

20 Claims, 8 Drawing Sheets

BLOCKCHAIN BASED INTEGRATED CIRCUIT AUTHENTICATION

RELATED APPLICATIONS

This application claims priority to U.S. Provisional Application No. 63/073,060, filed on Sep. 1, 2020, and entitled BLOCKCHAIN BASED INTEGRATED CIRCUIT AUTHENTICATION, the entirety of which is incorporated herein by reference.

STATEMENT OF GOVERNMENT INTEREST

This invention was made with Government support under Contract No. DE-NA0003525 awarded by the United States Department of Energy/National Nuclear Security Administration. The Government has certain rights in the invention.

TECHNICAL FIELD

The present invention relates to a method of authenticating an integrated circuit (IC) using blockchain technology and an authentication code associated with the IC.

BACKGROUND

The functionality of integrated circuits (ICs) is subject to subversion by various means. In some instances, software that is used to control functioning of an IC can be subverted by an attacker. In other instances, the hardware of an IC can be subverted to alter functionality of the IC, or the entirety of an IC can be surreptitiously replaced. This subversion can be used to avoid usage controls that govern usage of a software or hardware element (e.g., digital rights management, DRM), or can be employed to maliciously alter the functioning of a component from the functionality intended by the component's designer.

Conventionally, hardware security of ICs has been achieved through strict physical control measures. For example, a chain-of-custody of an IC can be monitored to ensure that only authorized, inherently trusted parties have possession of the IC. Provided the chain of custody remains intact, the IC can be considered to be "trusted." However, it can be difficult to ensure that a chain of custody among trusted parties has not been infiltrated or otherwise subverted. Furthermore, in many applications it is necessary for an IC to leave a trusted chain of custody prior to or during use.

SUMMARY

The following is a brief summary of subject matter that is described in greater detail herein. This summary is not intended to be limiting as to the scope of the claims.

Various technologies pertaining to a blockchain-based IC authentication are described herein. An exemplary system comprises a computing system and an IC fabrication system, wherein the computing system is configured to control the IC fabrication system in connection with manufacturing an IC. The computing system controls the IC fabrication system to fabricate an IC such that the IC has an authentication element included thereon. The authentication element is indicative of an authentication code that is associated with the IC (e.g., that is uniquely included on the IC and no other ICs). By way of example, and not limitation, the authentication element can comprise a physical characteristic of one or more layers of the IC (e.g., a line, a space, a trench, an island, etc.), wherein the authentication code associated with the IC can be determined based upon the physical characteristic. In further non-limiting examples, the authentication element can be or include an electrical circuit that is included on the IC and that is configured to output an electrical signal that is indicative of the authentication code associated with the IC, or the authentication element can be or include direct measurements or images of the electrical circuit.

The computing system additionally maintains a blockchain ledger that includes blocks that are each associated with or representative of a different IC or group of ICs (e.g., fabricated by the fabrication system). The computing system generates a transaction to be included in a block in the blockchain based upon the authentication code that is indicated by the authentication element included on the IC. By way of example, the computing system can evaluate a cryptographic function over the authentication code, combined with various additional data, to generate a cryptographic result that can be or be included in a block in the blockchain as a transaction. The computing system can generate an additional transaction for each subsequent IC that is manufactured, wherein each additional transaction in the blockchain is based upon an authentication code associated with the subsequent IC and a previous block in the blockchain. The computing system can commit a transaction to the blockchain by committing a block that includes the transaction, whereupon a block is expected to be substantially immutable once committed to the blockchain. Each block of the blockchain can include multiple transactions, or can include a single transaction.

Subsequent to manufacture of the IC, the IC can be exposed to an opportunity for subversion. For example, the IC can enter an untrusted supply chain by way of which the IC reaches an end user. The IC can then be authenticated as genuine based upon the authentication element included on the IC. For instance, the IC can be authenticated by an end user of the IC prior to the end user making use of the IC. In another example, the IC can be remotely authenticated by an authentication server. The IC can be authenticated by extracting or reading the authentication code from the authentication element included in or on the IC, computing an expected transaction value based upon the authentication code, and comparing the expected transaction value to one or more transaction values included in blocks in the blockchain. If the expected transaction value matches a transaction included in a block in the blockchain, the IC can be indicated to be genuine.

The technologies described herein provide various improvements to the art of IC security. Systems and methods described herein facilitate individualized authentication of ICs, such that each distinct IC can be authenticated based upon a different authentication code. Thus, even if an attacker were able to identify a valid authentication code and to replicate that code on an inauthentic IC, the attacker could not easily distribute multiple inauthentic ICs without capturing and replacing multiple authentic ICs, which increases the likelihood of detection. Furthermore, the blockchain can be implemented as a distributed ledger system such that existing states of the blockchain are not readily changed. Thus, it is difficult for an attacker to inject data into the blockchain that would allow an inauthentic IC to pass as an authentic IC. Other advantages are described and/or follow from the technologies described in greater detail herein.

The above summary presents a simplified summary in order to provide a basic understanding of some aspects of the systems and/or methods discussed herein. This summary is not an extensive overview of the systems and/or methods discussed herein. It is not intended to identify key/critical elements or to delineate the scope of such systems and/or methods. Its sole purpose is to present some concepts in a simplified form as a prelude to the more detailed description that is presented later.

BRIEF DESCRIPTION OF THE DRAWINGS

The drawings illustrate several embodiments of the invention, wherein identical reference numerals refer to identical or similar elements or features in different views or embodiments shown in the drawings. The drawings are not to scale and are intended only to illustrate the elements of various embodiments of the present invention.

DETAILED DESCRIPTION

Figure 1:
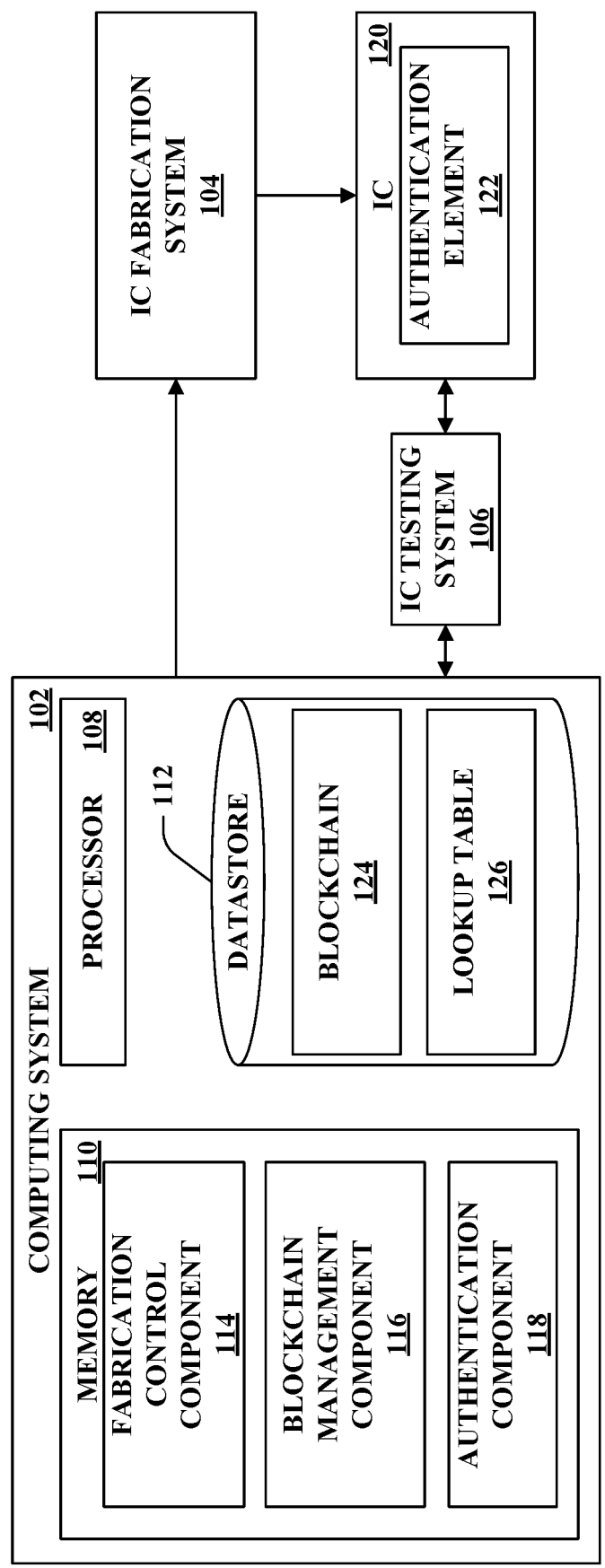
FIG. 1 is a functional block diagram of an exemplary system that facilitates authenticating ICs based upon a blockchain ledger generated in connection with manufacturing of the ICs.

Various technologies pertaining to authenticating manufactured components are now described with reference to the drawings, wherein like reference numerals are used to refer to like elements throughout. With greater specificity, described herein are technologies pertaining to authentication of an IC based upon an authentication element that is included on the IC and that indicates an authentication code associated with the IC. With still more specificity, systems and methods that facilitate authenticating an IC based upon the authentication code and a blockchain ledger are described herein. In the following description, for purposes of explanation, numerous specific details are set forth in order to provide a thorough understanding of one or more aspects. It may be evident, however, that such aspect(s) may be practiced without these specific details. In other instances, well-known structures and devices are shown in block diagram form in order to facilitate describing one or more aspects. Further, it is to be understood that functionality that is described as being carried out by certain system components may be performed by multiple components. Similarly, for instance, a component may be configured to perform functionality that is described as being carried out by multiple components.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Further, as used herein, the terms "component" and "system" are intended to encompass computer-readable data storage that is configured with computer-executable instructions that cause certain functionality to be performed when executed by a processor. The computer-executable instructions may include a routine, a function, or the like. It is also to be understood that a component or system may be localized on a single device or distributed across several devices. Additionally, as used herein, the term "exemplary" is intended to mean serving as an illustration or example of something, and is not intended to indicate a preference.

The distinction between "identify"/"identification" and "authenticate"/"authentication" as used herein is as follows. Identification is simply a value that should uniquely identify a person or an article. However, identities can be stolen or cloned. Authentication requires both a challenge and a response, both non-repeating. For example, authentication may be based on a private key (a secret) and provide a cryptographic guarantee that the person or article is authentic. As an example, identification may require a user to provide a username to an online banking application. Authentication may require sending a unique code to a user's cell phone after the user provides their username, and requiring the user to enter the received code. The secret in this example is the user's cell phone number and control thereof. Provided that the codes are unique, it is not practical to authenticate as a genuine user without the secret.

With reference to FIG. 1, an exemplary system 100 that facilitates fabricating and authenticating ICs is illustrated. The system 100 includes a computing system 102, an IC fabrication system 104, and an IC testing system 106. The computing system 102 further includes a processor 108, memory 110 that includes instructions that are executed by the processor 108, and a datastore 112. The memory 110 includes a fabrication control component 114, a blockchain management component 116, and an authentication component 118. Briefly, and as will be described in greater detail below, the computing system 102 is configured to control the IC fabrication system 104 to manufacture an IC 120 such that the IC 120 includes an authentication element 122 that is indicative of an authentication code. The computing system 102 is configured to generate a block of a blockchain 124 that is stored in the datastore 112, wherein the block is generated based upon the authentication code indicated by the authentication element 122. The computing system 102 is further configured to control the IC testing system 106 to read the authentication code from the authentication element 122 and to determine whether the IC 120 is genuine based upon the authentication code and the blockchain 124.

Operations of the system 100 are now described in greater detail. The fabrication control component 114 controls operation of the IC fabrication system 104 to cause the IC fabrication system 104 to manufacture the IC 120. By way of example, the fabrication control component 114 can receive, by way of input to the computing system 102, a computer-implemented circuit definition that defines a design or fabrication step of an IC. The computer-implemented circuit definition or fabrication information can be, for example, a set of photomasks for a photolithographic manufacturing process or instructions for a fabrication step. The fabrication control component 114 can be configured to control the IC fabrication system 104 to manufacture the IC 120 according to the design defined by the computer-implemented circuit definition. The IC fabrication system 104 can include any of various machines, devices, and other components suited to manufacturing ICs. By way of example, and not limitation, the IC fabrication system 104 can include photolithography components, material etching and deposition systems, an electron beam system, a focused ion beam (FIB) system, or the like.

The fabrication control component 114 controls the IC fabrication system 104 to manufacture the IC 120 such that the IC 120 includes an authentication element 122. The authentication element 122 is an element included on or in the IC 120 such that an authentication code can be identified based upon the authentication element 122. The authentication code can include substantially any data. In various embodiments, the authentication code can be randomly or pseudo-randomly generated by the fabrication control component 114 prior to manufacturing the IC 120. In some embodiments, the authentication code can include or be based upon the blockchain 124. For instance, the authentication code can be based upon a latest block of the blockchain 124. In additional embodiments, the authentication code can be or include data pertaining to one or more characteristics of the IC 120 itself.

Figure 2:
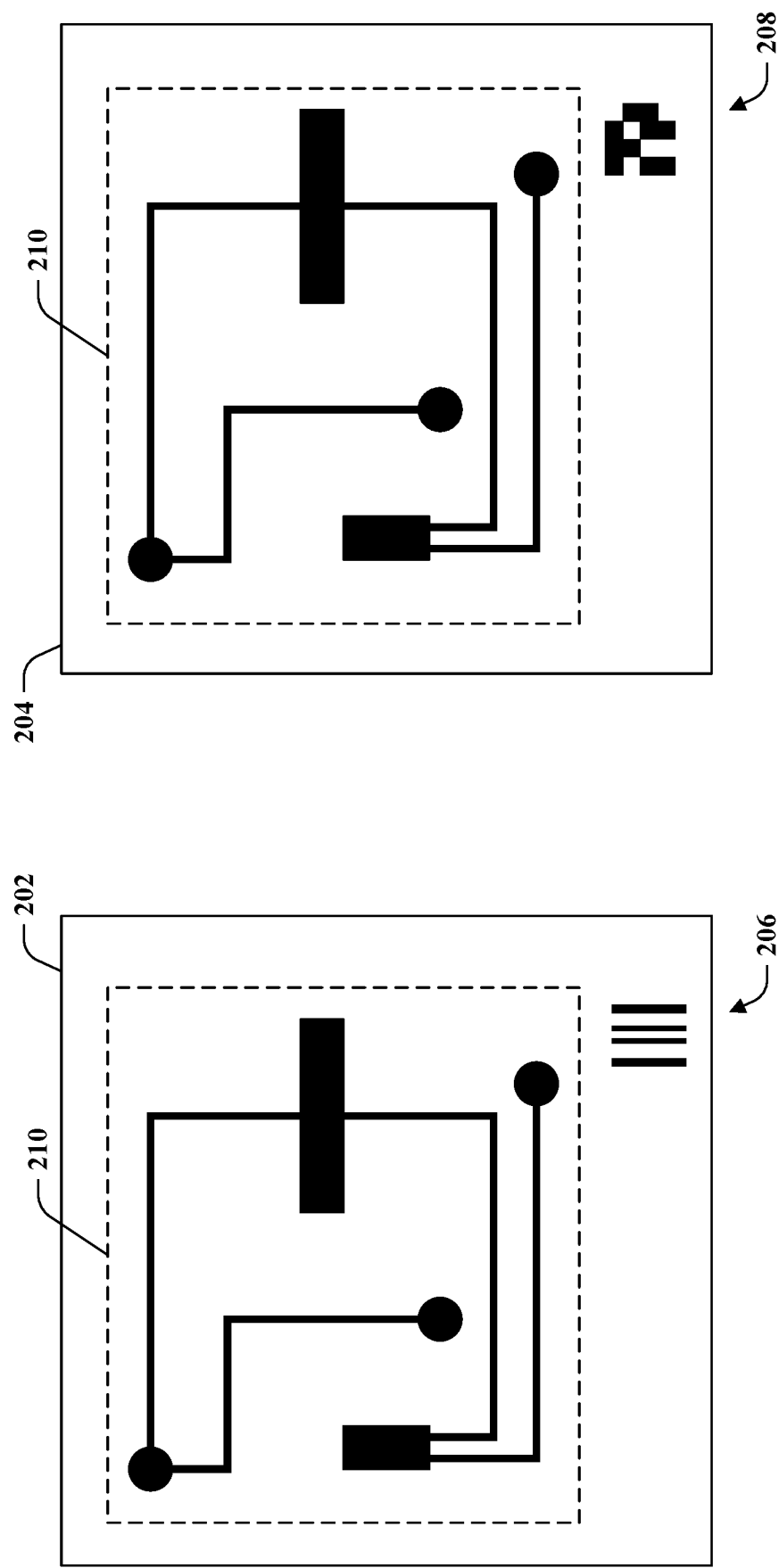
FIG. 2 depicts two ICs with authentication elements included thereon.

The authentication element 122 can be embodied by any of various means of encoding information in a readable manner. In exemplary embodiments, the authentication element 122 can include a barcode. For example, and referring now to FIG. 2, exemplary ICs 202, 204 are shown, wherein the first IC 202 includes a one-dimensional barcode 206 and the second IC 204 includes a two-dimensional barcode 208. In some embodiments, the barcodes 206, 208 can be printed in ink or other discernible marking substance on surface layers of the ICs 202, 204. In other embodiments, the barcodes 206, 208 can be formed by selectively removing material from or adding material to a surface of the ICs 202, 204. For example, trenches can be formed by selective etching of the ICs 202, 204, wherein the trenches form the patterns of the barcodes 206, 208. In other examples, a material can be selectively deposited on layers of the ICs 202, 204 to form raised portions, or islands, wherein the raised portions form the patterns of the barcodes 206, 208. In various embodiments, the barcodes 206, 208 can be positioned such that the barcodes 206, 208 are positioned a distance away from a functional portion 210 of the ICs 202, 204. As used herein, a functional portion of an IC refers to the portion of the IC that performs the intended functionality of the design of the IC. In other embodiments, the codes can be integrated with the functional portion of an IC. It is to be understood that authentication elements, such as the barcodes 206, 208, can be formed on ICs during the same fabrication process as functional elements, or can be formed on the ICs during subsequent processing steps. For example, the authentication elements can be formed on a plurality of ICs in a wafer of ICs simultaneously according to conventional IC manufacturing methods. In other examples, the authentication elements can be formed on ICs individually and sequentially. In yet other examples, the authentication elements may be affixed to the surface layers of the ICs 202, 204, and may include barcodes 206, 208, or other optically, electrically, or magnetically read characteristics, including, for example, holograms.

Referring once again to FIG. 1, in other exemplary embodiments, the authentication element 122 can be or include a circuit configured to output an electrical signal that is indicative of the authentication code associated with the IC 120. For example, the authentication element 122 can comprise a circuit that is configured to output the authentication code as a digital value (e.g., in response to receiving a request signal from the computing system 102 or the IC testing system 106). In such embodiments, the circuit that is included in the authentication element 122 can be part of a functional portion 210 of the IC 202, 204 or can be separate and distinct from the functional portion 210 of the IC 202, 204. While the output electrical signal may be read by the IC testing system 106 by making direct electrical contact with the circuit, in some embodiments, the circuit may be read using a radio frequency (RF) signal, a magnetic signal, or an optical signal from the IC testing system 106. The output signal from the circuit in these embodiments may, for example, be magnetic or electromagnetic in form. In yet other embodiments, the authentication element 122 may define data in a read-only memory (ROM) within the IC 202, 204.

While the above described embodiments employed an authentication element 122 comprising an electrical circuit, other embodiments may employ an authentication element 122 comprising other types of circuits. For example, in some embodiments the authentication element 122 comprises a magnetic circuit, an optical circuit, a microelectromechanical system (MEMS) circuit, or some combination of different types of circuits. Thus, as used herein, the term "circuit" is intended to encompass an electrical circuit, a magnetic circuit, an optical circuit, a MEMS circuit, or any combination thereof.

In some embodiments, the authentication element 122 comprises a physical unclonable function (PUF). A PUF is a type of circuit that has an output that is consistent under a given set of input conditions, but for which input conditions each instantiation of a PUF design will have a different output. Stated differently, a PUF has a repeatable output that is different from other PUFs and not predictable a priori based upon the design of the PUF. In embodiments wherein the authentication element 122 comprises a PUF, the authentication code can be or comprise a response of the PUF to a challenge signal for a given set of input conditions. As used herein, a challenge signal refers to an electrical signal provided as input to the PUF, whereas input conditions of the PUF refer to all other extant conditions that affect the PUF output at a time at which the challenge signal is provided to the PUF. The fabrication control component 114 can control the IC fabrication system 104 to form a PUF on the IC 120. Since the PUF response is not known a priori, the computing system 102 can control the IC testing system 106 to issue a challenge signal to the PUF in order to identify a PUF response that can be used as an authentication code associated with the PUF. As will be described in greater detail below, the authentication code associated with the authentication element 122 is used by the blockchain management component 116 to generate an additional block in the blockchain 124.

The fabrication control component 114 can control the IC fabrication system 104 such that each of the ICs produced by the IC fabrication system 104 has a different authentication element and a different corresponding authentication code. Thus, in some embodiments, the IC 120 has an authentication element 122 that is unique among ICs manufactured by the IC fabrication system 104. In other embodiments, the fabrication control component 114 can control the IC fabrication system 104 to manufacture ICs such that at least some ICs have the same authentication element and corresponding authentication code. For example, a batch of identical ICs can be manufactured to have authentication elements that are substantially identical. However, it will be understood by those of skill in the art in view of the present disclosure that stronger security can be achieved by manufacturing ICs to each have unique authentication elements and authentication codes. Further, it should also be understood that the authentication codes may not be output directly from the IC; for example, the authentication codes may be hashed, encrypted, or otherwise protected.

The IC testing system 106 comprises one or more devices that are configured to generate data indicative of the authentication code associated with the IC 120 based upon the authentication element 122 included on the IC 120. For example, in embodiments wherein the authentication element 122 comprises a printed barcode, the IC testing system 106 can include a conventional barcode reader. In embodiments wherein the authentication element 122 comprises a barcode formed by selective etching or deposition of material on a surface layer of the IC 120, the IC testing system 106 can include an imaging device that has sufficient resolution to resolve the features that form the pattern of the barcode. By way of example, the IC testing system 106 can include a scanning electron microscope (SEM) that generates images of a surface of the IC 120 on which the authentication element 122 is formed. In embodiments wherein the authentication element 122 is embodied by a circuit that outputs a signal indicative of the authentication code, the IC testing system 106 can include a component that can receive the signal (e.g., a communications interface).

The IC testing system 106 can further comprise various elements that are configured to test one or more electrical or other characteristics of the IC 120, or the functionality of the IC 120. For example, the IC testing system 106 can include components that are configured to measure resistance or capacitance of electrical components in the IC 120, geometric characteristics of components of the IC 120 (e.g., distance between traces on the IC 120, sizes of electrical elements of the IC 120, or thicknesses of one or more layers of the IC 120). In other examples, the IC testing system 106 can include components that are configured to provide input (e.g., electrical, RF, magnetic, or optical input signals) to components of the IC 120 and to measure corresponding outputs of such components.

The fabrication control component 114 can be configured to control the IC fabrication system 104 such that an authentication code indicated by the authentication element 122 includes data pertaining to characteristics or functionality of the IC 120. For example, the authentication element 122 can indicate an authentication code that includes a value of an electrical characteristic of a component of the IC 120, a value of a geometric characteristic of a component of the IC 120, or other characteristic of the IC 120. It is to be understood, therefore, that the authentication code indicated by the authentication element 122 can be based upon characteristics unique to the particular IC 120 on which the authentication element 122 is included.

As noted above, the system 100 is configured to generate and store a blockchain 124 that can be used to authenticate ICs manufactured by the IC fabrication system 104 after the ICs leave a trusted chain of custody. The blockchain management component 116 is configured to generate data blocks that are added to the blockchain 124. The blockchain management component 116 generates a transaction that is representative of the IC 120 based upon the authentication code indicated by the authentication element 122. The blockchain management component 116 generates a block to be added to the blockchain 124, wherein the block is based upon the generated transaction and a previous block in the blockchain 124. In some embodiments the blockchain management component 116 can also generate the transaction based upon a previous block in the blockchain 124. For example, the authentication code upon which a transaction is based can include data from an existing block in the blockchain 124. After generating the transaction, the blockchain management component 116 can add a block to the blockchain 124 that includes the transaction, thereby committing the transaction to the blockchain 124. It is to be understood that a block in the blockchain 124 can include multiple transactions or can include only a single transaction.

Figure 3:
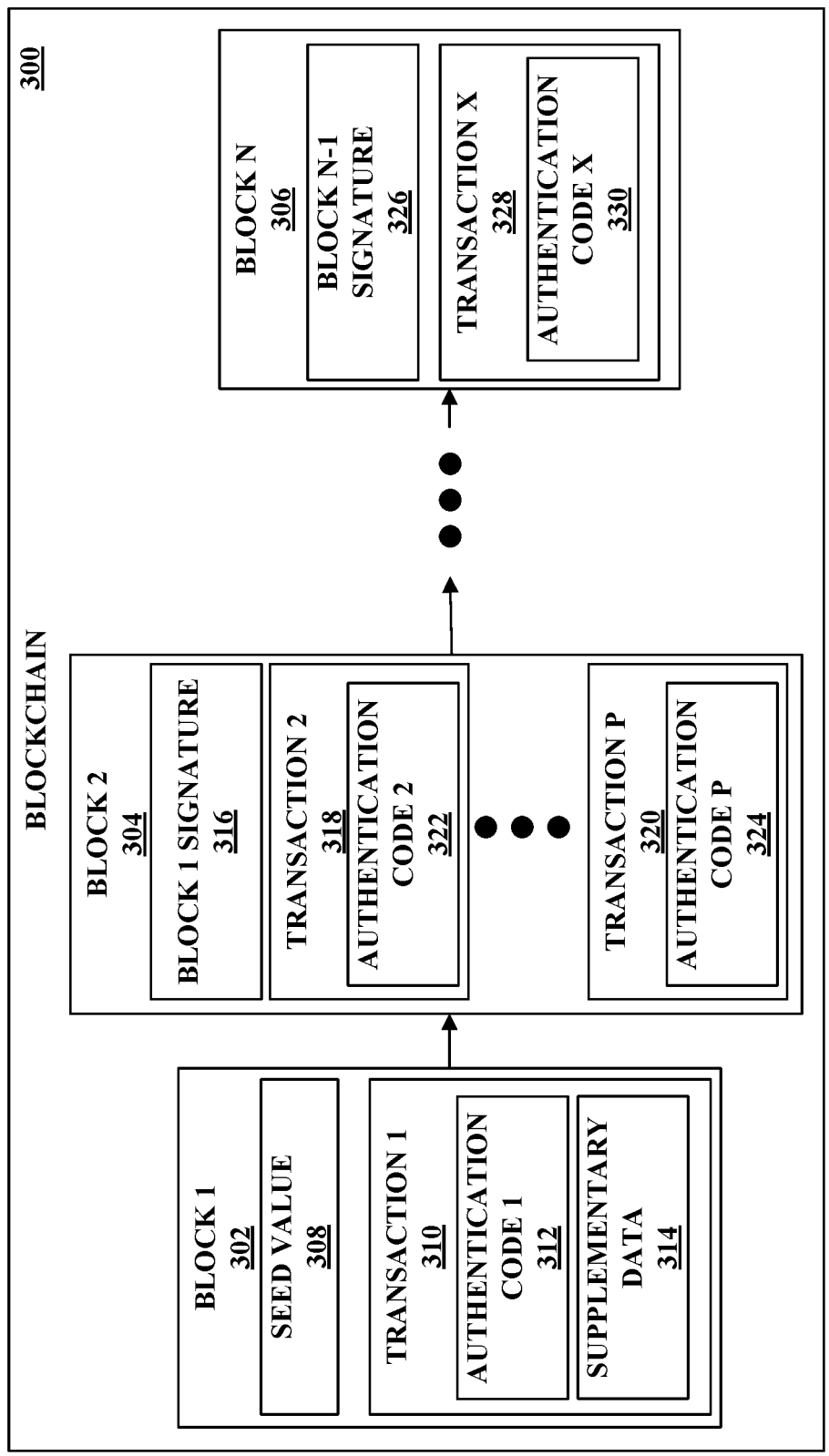
FIG. 3 is a block diagram of an exemplary blockchain that is usable to authenticate ICs.

Referring now to FIG. 3, an exemplary blockchain 300 is shown, wherein the blockchain 300 comprises a plurality of N blocks 302-306, where N is an integer greater than 1. Each of the blocks 302-306, save the first block 302, comprises data that is based upon a block that precedes it in the blockchain 300, and at least one transaction that includes an authentication code associated with an IC (e.g., manufactured by the IC fabrication system 104). Since the first block 302 has no preceding block in the blockchain, the first block 302 can be generated based upon a seed value. The blockchain 300 can contain substantially any number of blocks, and since the value of each of the blocks 302-306 is dependent upon at least one preceding block, modification of a block in the blockchain 300 can be detected by examination of the preceding and/or subsequent blocks in the blockchain 300.

Referring once again to FIG. 1, in exemplary embodiments, the blockchain management component 116 generates a transaction to be included in the blockchain 124 by executing a cryptographic function over a set of data to generate a cryptographic result. The blockchain management component 116 can then store the cryptographic result as a transaction in a block in the blockchain 124. In a non-limiting example, the cryptographic result comprises a result of the cryptographic function being executed over the authentication code that is indicated by the authentication element 122 and all or a portion of a value of a previous block in the blockchain 124. In exemplary embodiments, the cryptographic function can be a hash function, such that each of the blocks of the blockchain 124 is represented by the same number of bits, or substantially any other type of cryptographic function.

As used herein, a transaction or a block is said to include given data if the transaction or block includes a cryptographic result of executing a cryptographic function over a set of data that includes the given data. For example, and referring once again to FIG. 3 the first block 302 in the blockchain 300 comprises a seed value 308 and a first transaction 310 that itself includes a first authentication code 312 associated with a first IC. In other words, the first block 302 includes a seed value 308 and a first transaction 310 that is represented by a binary string that is the result of execution of a cryptographic function over a set of data that includes the seed value 308 and the authentication code 312. Thus, although the first transaction 310 may not have the first authentication code 312 exactly reproduced therein, the first transaction 310 includes the first authentication code 312 if the result of execution of a cryptographic function over the first authentication code 312 is included in the first transaction 310. The first transaction 310 can further include supplementary data 314, as will be described in greater detail below.

The second block 304 of the blockchain 300 includes a signature 316 of the first block 302, which can be or include a hash of the first block 302 (wherein the first block 302 includes the seed value 308, the first transaction 310, and any other data included in the first block 302). In other embodiments, the signature 316 can comprise a portion of the first block 302, or can include a value that is distinct from the value of the first block 302 but that is derived from the value of the first block 302 (e.g., a cryptographic result of execution of a cryptographic function over all or a portion of the first block 302). Then, the second block 304 contains any amount of data that is to be added to the block chain 300. By way of example, the second block 304 can include a plurality of transactions that includes a second transaction 318 through a pth transaction 320, where P is an integer. Each of the transactions two through P includes a respective authentication code that is indicated by an authentication element included on an IC that the transaction represents. For example, the second transaction 318 includes a second authentication code 322 that is indicated by an authentication element included on a second IC, and that is different from the authentication code 312 included in the first transaction 310. By way of further example, the pth transaction 320 includes a pth authentication code 324 corresponding to a pth IC. Similarly, the Mh block 306 includes a signature of an N-Ith block 326 and an Xth transaction 328 that includes an Xth authentication code 330 for an Xth IC, wherein X is a total number of transactions included in the blockchain 300 through block N. As will be understood by one of ordinary skill in the art, the blockchain 300 will also include metadata (not illustrated) outside of the individual blocks 302, 304, 306. This metadata may include, for example, the signature of the latest block, i.e., block N 306, which will be updated each time a new block is added to the blockchain 300.

The blockchain management component 116 can generate the blocks of the blockchain 124 such that they include substantially any desired data in addition to an authentication code and a value of a preceding block in the blockchain 124. For example, and referring once again to FIG. 3, the first block can include supplementary data 314 that includes substantially any data that is desirably included in the transaction 310. In other exemplary embodiments, a block of the blockchain 124 can include supplementary data that is not part of a specific transaction, wherein such data may pertain to or be representative of multiple transactions included in the block or ICs represented by such transactions. In various non-limiting examples, the blockchain management component 116 can generate the blockchain such that a block or a transaction includes a time of fabrication of the IC 120, an identifier of a photomask or photomasks used to fabricate the IC 120, results of performance tests of components of the IC 120 (e.g., as performed by the IC testing system 106), randomly or pseudo-randomly generated data, etc. Such supplementary data that is not stored as part of a specific transaction can instead be included in a block signature or as separate data in a block.

In exemplary embodiments, the blockchain management component 116 generates a new additional transaction to be added to the blockchain 124 for each additional IC manufactured by the IC fabrication system 104. For example, the fabrication control component 114 can be configured to control the IC fabrication system 104 such that each IC produced by the IC fabrication system 104 has an authentication element that indicates a different authentication code. The blockchain management component 116 can generate a different transaction of the blockchain 124 for each of the ICs based on each IC's respective authentication code. It is to be understood, however, that the blockchain management component 114 can generate a transaction that is representative of multiple ICs. By way of example, and not limitation, the blockchain management component 116 can generate a transaction that is representative of a plurality of ICs that have substantially identical authentication elements included thereon.

The authentication component 118 is configured to authenticate an IC under test (e.g., the IC 120 or some other IC of uncertain origin) based upon the blockchain 124 and an authentication code indicated by an authentication element included on the IC. By way of an example, after manufacture of the IC 120 by the IC fabrication system 104 and addition of a block that is representative of the IC 120 to the blockchain 124, the IC 120 can leave a trusted chain of custody. After the IC 120 has left the trusted chain of custody, it may be desirable for the IC 120 to be authenticated. In a non-limiting example, it may be desirable for the computing system 102 to authenticate the IC 120 to authorize the IC 120 to access a network resource. In another example, it may be desirable for an end-user of the IC 120 to ensure that the IC that he or she has received or purchased is genuinely an IC manufactured by the IC fabrication system 104 (e.g., as opposed to having been manufactured or supplied by a counterfeiting entity). In the following explanation, it will be assumed that an IC under test is the IC 120, however, it is to be understood that in general it is not known a priori whether an IC under test is an IC manufactured by the IC fabrication system 104.

The authentication component 118 causes the IC testing system 106 to read an authentication code from the authentication element 122 of the IC 120. As noted above, the specific manner in which the testing system 106 reads the authentication code from the authentication element 122 depends on the nature of the authentication element 122. For example, in embodiments wherein the authentication element 122 comprises geometric characteristics of the IC 120 (e.g., lines, spaces, trenches, islands, or the like), the IC testing system 106 can include an SEM, and the authentication code can be read from the authentication element 122 based upon an SEM image of the authentication element 122. In embodiments wherein the authentication element 122 comprises a circuit that is configured to output an electrical signal indicative of an authentication code, the IC testing system 106 can include a communications interface that is configured to receive the electrical signal. The IC testing system 106 can output data indicative of the authentication code to the authentication component 118 based upon receiving the electrical signal. Accordingly, it is to be understood that, as used herein, reading an authentication code from an authentication element is intended to include substantially any means or manner by way of which an authentication code can be determined from an authentication element included on an IC. It is further to be understood that reading the authentication code from the authentication element 122 is intended to encompass functionality performed by either or both of the authentication component 118 included on the computing system 102 or the IC testing system 106.

Upon reading the authentication code from the authentication element 122, the authentication component 118 evaluates the authentication code against the blockchain 124. The authentication component 118 evaluates whether the authentication code is a valid input for generation of one of the transactions included in the blockchain 124. For example, the authentication component 118 can execute the same cryptographic function used to generate transactions included in blocks of the blockchain 124 over the authentication code (and any other data used by the blockchain management component 116 in combination with an authentication code to generate transactions of the blockchain 124) in order to generate a cryptographic result. The authentication component 118 can then evaluate whether the cryptographic result matches any of the transactions included in the blockchain 124.

In general, a value of a transaction included in the blockchain 124 is dependent on the authentication code of the IC that the transaction represents, and a value of a preceding block in the blockchain 124. Accordingly, in some embodiments the authentication component 118 evaluates whether the authentication code is a valid code iteratively until either the authentication code has been checked against all of the transactions of the blockchain 124 or the authentication code has been determined to match one of the transactions of the blockchain 124. In a non-limiting example, in evaluating the authentication code against the blockchain 124, the authentication component 118 selects a position (e.g., a block) in the blockchain 124 against which to test the authentication code read from the authentication element 122. The authentication component 118 then executes the cryptographic function based upon the authentication code and a block in the blockchain that immediately precedes the selected position. If the cryptographic result of execution of the cryptographic function matches a transaction included in the block in the selected position of the blockchain 124, the authentication component 118 outputs an indication that the IC 120 is an authentic IC (or stated differently, that the IC is authenticated). If the cryptographic result does not match any transactions included in the block in the selected position, the authentication component 118 can repeat the process of selecting a position in the blockchain 124 and evaluating the cryptographic function based upon the authentication code and the preceding block. If the cryptographic result does not match a transaction in the selected block for every block in the blockchain 124, the authentication component 118 outputs an indication that the IC 120 is not authenticated.

The authentication component 118 can be configured to select a position in the blockchain 124 for evaluation of the authentication code according to any of various algorithms. In various non-limiting examples, the authentication component 118 can evaluate the authentication code against transactions of the blockchain in order from first to last, last to first, from a middle position and alternating between earlier and later blocks, or substantially any other order.

In various embodiments, in order to save computing resources, the datastore 112 can include a lookup table 126 that comprises a matching between positions of blocks in the blockchain 124 and authentication codes that correspond to transactions included in such blocks. For example, the blockchain management component 116 can be configured to generate the lookup table 126 as the blockchain management component 116 generates blocks of the blockchain 124. In such embodiments, the authentication component 118 can be configured to evaluate the authentication code against transactions included in the block of the blockchain that is at a position indicated in the lookup table 126 as corresponding to the authentication code. If no transactions in the block at the indicated position are a match to the authentication code, the authentication component 118 outputs an indication that the IC under test is not authenticated. Furthermore, if the authentication code is not included in the lookup table 126, the authentication component 118 can be configured to output an indication that the IC under test is not authenticated. For example, the authentication component 118 can output the indication to a display (not shown) that can be included in the computing system 102.

The authentication component 118 can be configured to require additional authentication prior to outputting an indication that the IC 120 is authenticated. For example, in embodiments wherein the authentication code includes data indicative of a characteristic of the IC 120, the authentication component 118 can be configured to confirm that an IC under test (e.g., the IC 120) actually has the indicated characteristic. By way of example, if the authentication code indicates a resistance of an electrical element included on the IC 120, the authentication component 118 can control the IC testing system 106 to confirm that the IC under test has the electrical element and that the element of the IC under test has the indicated resistance. If the authentication component 118 determines that the IC under test does not have the electrical element, or that the electrical element does not have the resistance value indicated by the authentication code, the authentication component 118 can output an indication that the IC under test is not authenticated.

Figure 4:
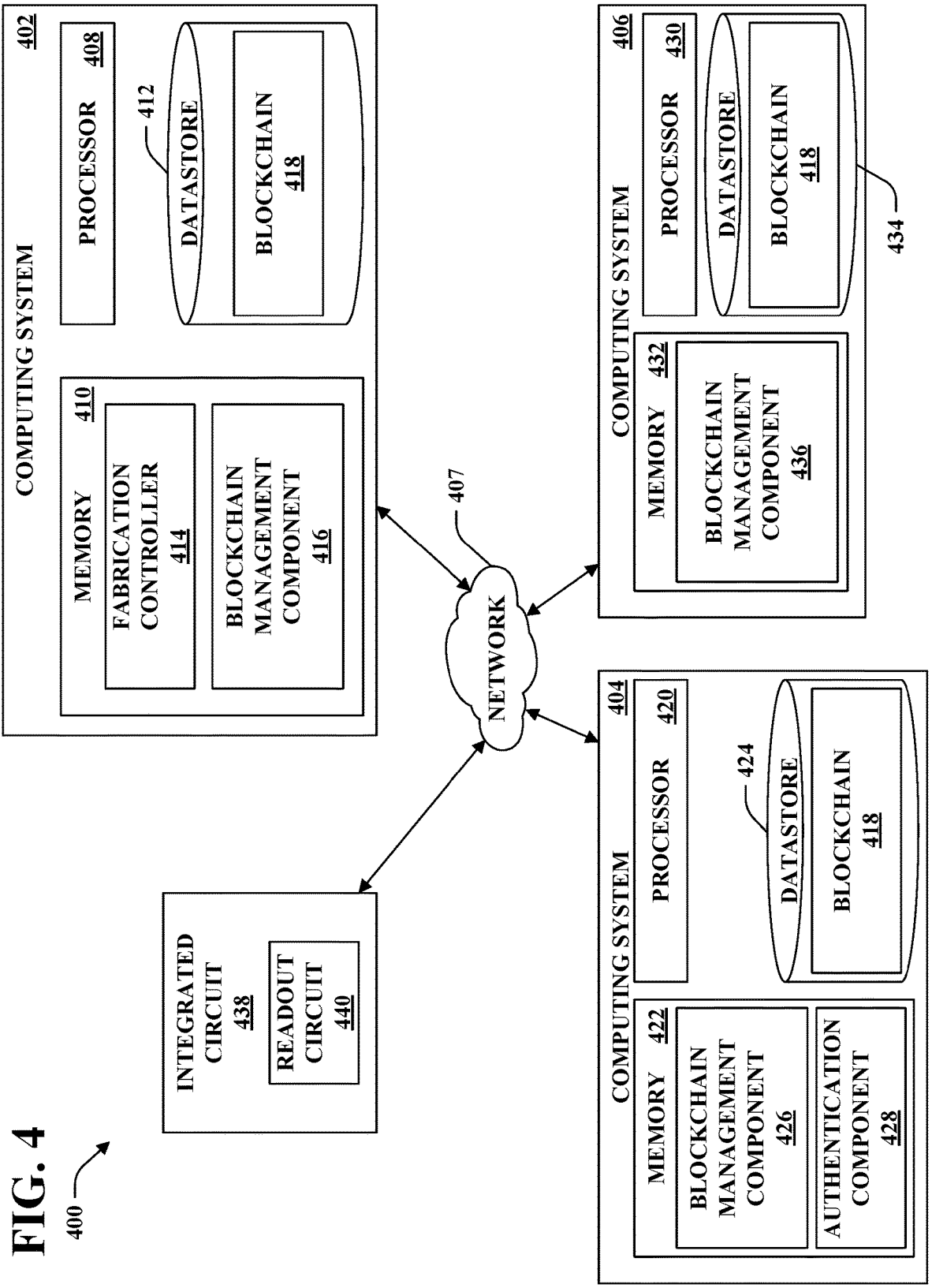
FIG. 4 is a functional block diagram of an exemplary system that facilitates authenticating ICs remotely.

Referring now to FIG. 4, an exemplary system 400 that facilitates remote authentication of ICs is shown. The system 400 comprises a first computing system 402 that controls fabrication of ICs such that the ICs have authentication elements included thereon. The system 400 further comprises a second computing system 404 that is configured to authenticate ICs based upon authentication elements included on the ICs. The system still further comprises a third computing system 406 that is configured to jointly maintain a distributed blockchain ledger with the computing systems 402, 404. The computing systems 402-406 are in communication with one another by way of a network 407. The network 407 can be a wide area network (WAN) such as the Internet, a local area network (LAN), or any other suitable means of communication among the computing systems 402-406. It is to be understood that the network 407 can include multiple networks that provide functionality described herein with respect to the network 407.

The first computing system comprises a processor 408, memory 410, and a datastore 412. The memory 410 includes a fabrication controller 414 that controls an IC fabrication system (not shown) to manufacture or measure ICs such that the ICs have authentication elements included thereon (e.g., as described above with respect to FIG. 1). The memory 410 further includes a blockchain management component 416 that is configured to generate a blockchain 418 that is stored in the datastore 412, wherein the blockchain 418 comprises blocks that are each associated with a respective IC.

The second computing system 404 comprises a processor 420, memory 422, and a datastore 424. The memory 422 comprises a blockchain management component 426 and an authentication component 428. The blockchain management component 426 jointly maintains the blockchain 418 with the blockchain management component 416, such that the blockchain 418 is stored both in the datastore 412 of the first computing system 402 and the datastore 424 of the second computing system 404.

The third computing system 406 comprises a processor 430, memory 432, and a datastore 434. The memory 432 comprises a blockchain management component 436 that jointly maintains the blockchain 418 with the blockchain management components 416, 426 of the first and second computing systems 402, 404, respectively. In other words, the third computing system 406 stores a copy of the blockchain 418 in its datastore 434. When an IC is manufactured or measured in accordance with control signals output by the fabrication controller 414, the blockchain management component 416 generates a proposed transaction of the blockchain 418. The blockchain management components 416, 426, 436 can communicate by way of the network 407 to authorize commitment of the proposed transaction in a block to be added to the blockchain 418. In a non-limiting example, the blockchain management components 416, 426, 436 can authorize commitment of the proposed transaction based upon a majority or unanimous voting scheme. In exemplary embodiments, the blockchain management components 416, 426, 436 can be configured only to vote to authorize proposed transactions originating from authenticated sources (e.g., the first computing system 402). Upon authorization of commitment of the transaction, the blockchain management components 416, 426, 436 can update the blockchain 418 stored in the datastores 414, 424, 434, respectively, to include a block that includes the proposed transaction.

FIG. 4 further depicts an IC 438. The IC 438 is an IC that includes a readout circuit 440 that is configured to output an electrical signal indicative of an authentication code associated with the IC 438. By way of example, and not limitation, the readout circuit 440 can be or include a PUF, and the electrical signal can be a response of the PUF to an input signal. The IC 438 can be configured to cause the readout circuit 440 to output the electrical signal, and can further be configured to transmit the authentication code to the authentication component 428 by way of the network 407. Responsive to receiving the authentication code, the authentication component 428 can authenticate the IC 438 based upon the authentication code and the blockchain 418. Upon authenticating the IC 438 as genuine, the authentication component 428 can output an indication that the IC 438 is authenticated. In exemplary embodiments, the authentication component 428 can output the indication to another device on the network 407, wherein the IC 438 is permitted to access the other device on the network 407 based upon the authentication indication being transmitted to that device. In other embodiments, the authentication component 428 can output the indication to the IC 438 itself, wherein receipt of the authentication indication enables the IC 438 to perform some functionality.

Since the IC 438 may be remote from the computing system 404, the computing system 404 may have no information pertaining to the IC 438 apart from its asserted authentication code. To subvert the system 400, an inauthentic IC could communicate an authentication code to the authentication component 428 despite the IC having no authentication element included thereon. In other attacks, multiple inauthentic ICs could be given the same, valid authentication code to submit for authentication. Accordingly, the authentication component 428 can be configured to determine whether an otherwise valid authentication code is indicative of an inauthentic IC. In various non-limiting examples, the authentication component 428 can output an indication that an IC under test is inauthentic if the authentication code submitted by the IC under test is an authentication code that has been submitted for authentication too frequently (e.g., more than once in a single hour, more than once in 15 minutes, or more than once in a single minute). In another example, if the same authentication code is submitted by ICs from different physical or network locations, the authentication component 428 can determine that the authentication requests originate from inauthentic ICs if the requests are too close together in time. For instance, if two authentication requests that share an authentication code are received from ICs identifiably located in California and New York, respectively, the authentication component 428 can determine that the ICs are inauthentic if the requests are received five minutes apart.

Figure 5:
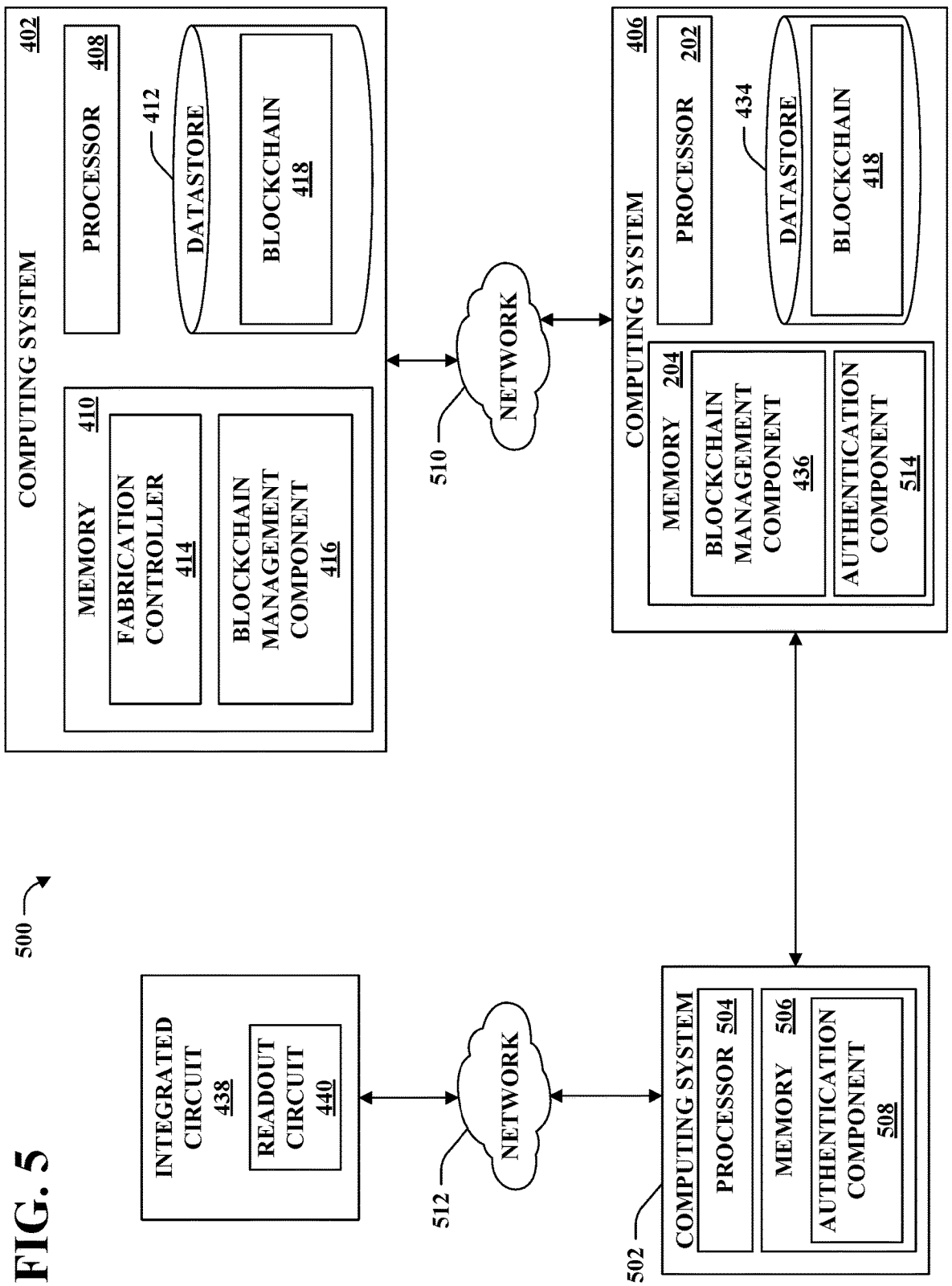
FIG. 5 is a functional block diagram of another exemplary system that facilitates remote authentication of ICs.

In various embodiments, an authentication system can be configured such that parties seeking authentication of ICs are not in direct communication with a computing system that stores the blockchain. For example, and referring now to FIG. 5, an exemplary system 500 is illustrated, wherein the system 500 includes the computing systems 402 and 406. The system 500 further includes a computing system 502 that includes a processor 504 and memory 506 that stores an authentication component 508. The computing systems 402 and 406 store the blockchain 418 generated in connection with fabrication of ICs controlled by the computing system 402. The computing systems 402 and 406 can be configured to communicate with one another by way of a secure network 510 that is not generally accessible by devices that are not previously authorized. Thus, the computing systems 402 and 406 can communicate updates to the blockchain 418 while remaining substantially insulated from potentially untrusted or unauthenticated devices (e.g., the IC 438).

In connection with authenticating the IC 438, the computing system 502 receives an authentication request (e.g., a message that comprises the authentication code read out from the readout circuit 440) by way of a separate network 512 that is not connected to the secure network 510. To authenticate the IC 438, the authentication component 508 can be configured to transmit the authentication code to the computing system 406. The computing system 406 can further include an authentication component 514 that is configured to determine, based upon the authentication code and the blockchain 418 stored in the datastore 434, whether the IC 438 is an authentic IC. The authentication component 514 can then output an indication of whether the IC 438 is authentic to the computing system 502. Thus, in the exemplary system 500, a state of the blockchain 418 is never transmitted to or stored on devices other than those on the secure, trusted network 510. Responsive to receipt of the indication of whether the IC 438 is authentic, the authentication component 508 can perform one or more of various actions. For example, the authentication component 508 can deny the IC 438 access to a resource on the network 512 if the authentication component 514 outputs an indication that the IC 438 is not authentic. In another example, responsive to receiving an indication that the IC 438 is authentic, the authentication component 508 can output an authorization signal to the IC 438 that is configured to permit the IC 438 to access some restricted functionality of the IC 438. In some instances, authentication of the IC 438 can be based further upon data received from a device independent of the IC 438. By way of example, the authentication component 508 can require input from a smart card or security dongle in addition to receiving an indication that the IC 438 is authentic from the computing system 406 prior to enabling some functionality (e.g., authorizing access to a restricted resource).

Authentication technologies described herein provide various security advantages compared to conventional forms of IC security. Since values of subsequent blocks in the blockchain 124 are dependent on the values of preceding blocks, the blockchain 124 is generally resistant to subversion or modification by an attacker. In other words, if an attacker wishes to modify a block in the blockchain 124, in general the attacker will have to additionally modify preceding or subsequent blocks in the blockchain 124 to avoid detection. As additional blocks are added to the blockchain 124, the likelihood of a given modification of the blockchain 124 going undetected becomes smaller. In embodiments wherein the blockchain 124 is maintained as a distributed ledger (e.g., as in the systems 400 and 500 shown in FIGS. 4 and 5), an attacker would further be required to modify the contents of the blockchain 124 at each location where the blockchain 124 is stored to avoid detection.

To subvert an IC without modifying the blockchain 124, an attacker would need to replicate an existing, valid authentication code of an IC that is already represented by a block in the blockchain 124. Further, in embodiments wherein the authentication element 122 or the blockchain 124 includes data that is representative of characteristics of the IC 120, replacing the IC 120 with a counterfeit IC would require an attacker to either replicate the characteristics of the IC 120 in the counterfeit IC. Each of these approaches poses great difficulty for an attacker, and furthermore limit the scope of a potential attack to a small number of ICs that share the same authentication code. In embodiments wherein each IC has its own distinct authentication code, an attacker is generally only able to subvert an IC that he has physical control over.

Figure 6:
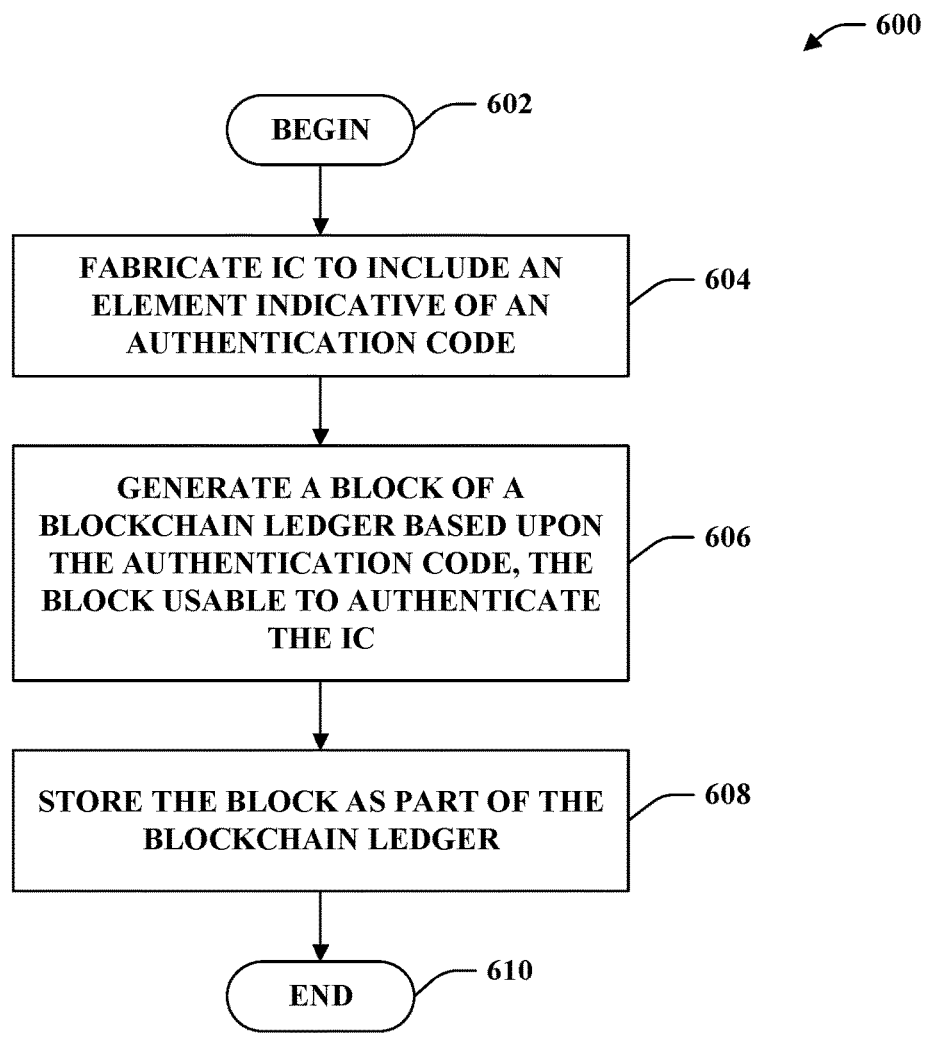
FIG. 6 is a flow diagram that illustrates an exemplary methodology for manufacturing ICs and maintaining a blockchain ledger such that the ICs can subsequently be authenticated by way of the blockchain ledger.
Figure 7:
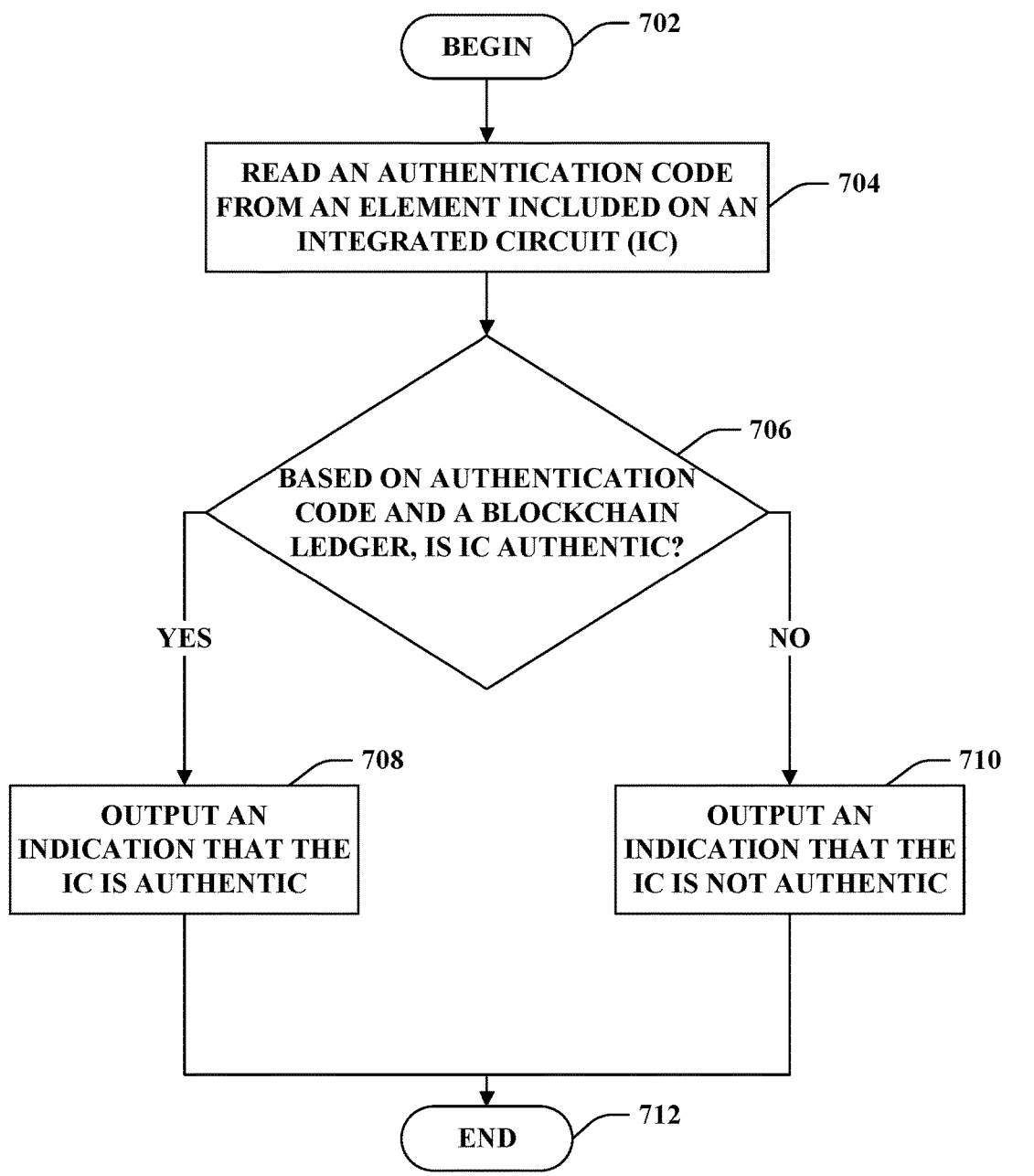
FIG. 7 is a flow diagram that illustrates an exemplary methodology for authenticating ICs based upon a blockchain.

FIGS. 6 and 7 illustrate exemplary methodologies relating to authentication of ICs based upon a blockchain ledger. While the methodologies are shown and described as being a series of acts that are performed in a sequence, it is to be understood and appreciated that the methodologies are not limited by the order of the sequence. For example, some acts can occur in a different order than what is described herein. In addition, an act can occur concurrently with another act. Further, in some instances, not all acts may be required to implement a methodology described herein.

Moreover, the acts described herein may be computer-executable instructions that can be implemented by one or more processors and/or stored on a computer-readable medium or media. The computer-executable instructions can include a routine, a sub-routine, programs, a thread of execution, and/or the like. Still further, the results of acts of the methodologies can be stored in a computer-readable medium, displayed on a display device, and/or the like.

Referring now to FIG. 6, a methodology 600 that facilitates manufacturing ICs such that the ICs can be authenticated by a blockchain ledger is illustrated. The methodology 600 begins at 602 and at 604, an IC is fabricated such that the IC includes an authentication element that is indicative of an authentication code. The authentication element is a physical characteristic of the IC from which the authentication code can be determined. In exemplary embodiments, the authentication element can be or include a printed barcode, a barcode formed by selective deposition or removal of material from a layer of the IC, a circuit that is formed on the IC and that is configured to output or enables identification of a signal indicative of the authentication code, or the like. The authentication element and its corresponding authentication code can be different from authentication elements and authentication codes included on other ICs, including ICs that are otherwise substantially identical (e.g., ICs that are fabricated on the same wafer according to the same photomask).

At 606, a block of a blockchain ledger is generated based upon the authentication code that is indicated by the authentication element included on the IC at 604. By way of example, a transaction that is representative of the IC can be generated based upon the authentication code, and a block that includes the transaction can be generated at 606. The block of the blockchain that is generated at 606 is representative of the IC that is fabricated at 604. The blockchain can be used to authenticate the IC after the IC has left a trusted chain of custody. The block can be generated based upon execution of a cryptographic function (such as, but not limited to, a hash function) over the authentication code and data included in at least one preceding block of the blockchain (e.g., to generate a transaction). If the block is a first block in the blockchain, the block can be generated by executing the cryptographic function over the authentication code and a seed value. At 608, the block is stored as part of the blockchain, whereupon the methodology completes at 610. The stored block can subsequently be used to authenticate the IC, as described below with respect to FIG. 7.

Referring now to FIG. 7, a methodology 700 that facilitates authenticating an IC based on an authentication element included on the IC and a blockchain ledger generated in connection with manufacturing the IC is illustrated. The methodology 700 begins at 702, and at 704, an authentication code is read from an authentication element included on an IC. As noted above, the authentication element can take any of various forms, and the way the authentication code is read from the authentication element is dependent upon an embodiment of the authentication element. After determining the authentication code by reading the authentication code from the authentication element, a determination is made at 706, based upon the authentication code and a blockchain ledger whether the IC is authentic. The blockchain ledger comprises blocks representative of authentic ICs.

The IC can be determined to be authentic at 706 by evaluating whether the authentication code is a code previously used to generate a valid transaction included in a block of the blockchain. By way of example, to determine whether a given transaction of a blockchain is representative of an IC, a cryptographic function used to generate the transaction can be executed over the authentication code read at 704 and any other data that may have been used to generate the transaction initially (e.g., a value of a block in the blockchain that precedes the block that includes the transaction, supplementary data, etc.). If the authentication code is the same authentication code used to generate the transaction, then the cryptographic result of execution of the cryptographic function should have the same value as the transaction. Therefore, if the cryptographic result has the same value as the transaction, then the transaction can be determined to be representative of the IC, and the IC is determined to be authentic at 706. If the cryptographic result does not have the same value as the transaction, then the process of executing the cryptographic function can be repeated for each of the transactions of the blockchain (or a subset of the transactions known to be potentially representative of the IC under test). If no match is found among the transactions of the blockchain, it is determined at 706 that the IC is not authentic. If the IC is determined to be authentic at 706, an indication that the IC is authentic is output at 708 and the methodology 700 completes at 712. If the IC is determined not to be authentic at 706, an indication that the IC is not authentic is output at 710, and the methodology 700 completes at 712.

It is to be understood from the foregoing that various technologies described herein may be used to provide a means to authenticate substantially any manufactured article and is not limited to ICs. A manufacturing process of a non-IC article can be controlled such that an authentication element is included on the non-IC article. By way of example, and not limitation, the non-IC article can be manufactured to have a one- or two-dimensional barcode printed or affixed thereon, wherein the barcode is indicative of an authentication code associated with the non-IC article.

In another example, an electrical circuit can be affixed to or otherwise included in a non-IC article, wherein the electrical circuit is configured to output an electrical, magnetic, or electro-magnetic signal indicative of the authentication code. A blockchain can be generated based upon the authentication code, and the non-IC article can be authenticated based upon the blockchain and the authentication code, as described above.

Figure 8:
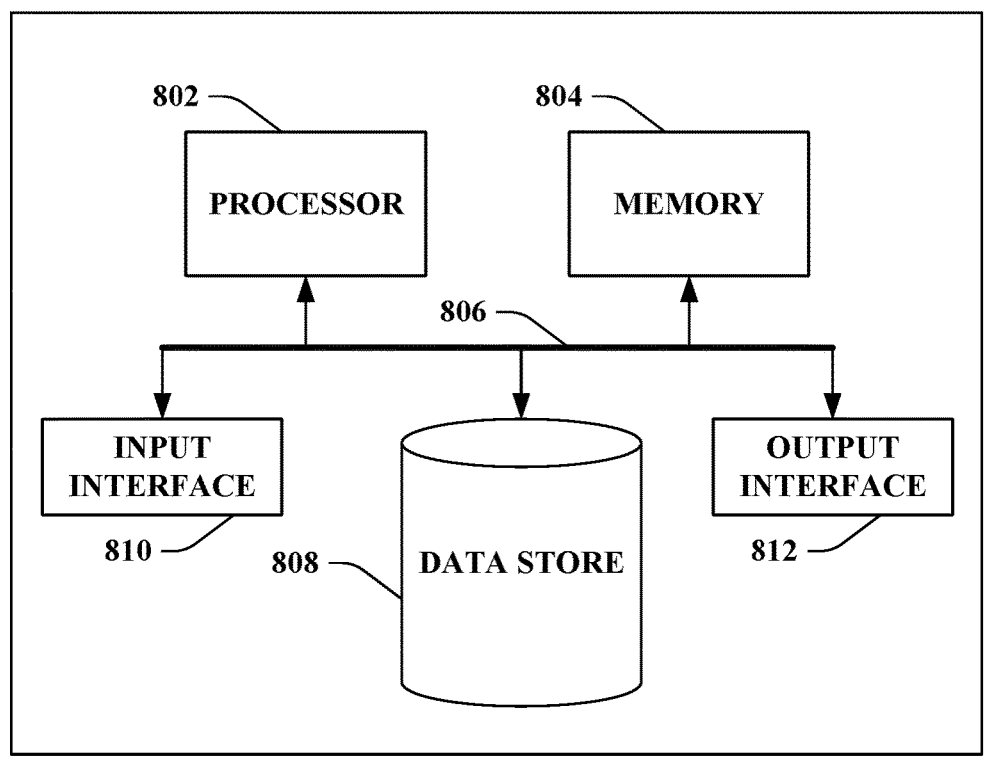
FIG. 8 is an exemplary computing system.

Referring now to FIG. 8, a high-level illustration of an exemplary computing device 800 that can be used in accordance with the systems and methodologies disclosed herein is illustrated. For instance, the computing device 800 may be used in a system that controls fabrication of ICs. By way of another example, the computing device 800 can be used in a system that generates a blockchain to facilitate authentication of ICs. In still another example, the computing device 800 can be used in a system that authenticates ICs based upon authentication elements included on the ICs and a blockchain that is representative of authentic ICs. The computing device 800 includes at least one processor 802 that executes instructions that are stored in a memory 804. The instructions may be, for instance, instructions for implementing functionality described as being carried out by one or more components discussed above or instructions for implementing one or more of the methods described above. The processor 802 may access the memory 804 by way of a system bus 806. In addition to storing executable instructions, the memory 804 may also store authentication codes, a blockchain ledger that is representative of authentic ICs, etc.

The computing device 800 additionally includes a data store 808 that is accessible by the processor 802 by way of the system bus 806. The data store 808 may include executable instructions, a blockchain ledger, etc. The computing device 800 also includes an input interface 810 that allows external devices to communicate with the computing device 800. For instance, the input interface 810 may be used to receive instructions from an external computer device, from a user, etc. The computing device 800 also includes an output interface 812 that interfaces the computing device 800 with one or more external devices. For example, the computing device 800 may display text, images, etc., by way of the output interface 812.

It is contemplated that the external devices that communicate with the computing device 800 via the input interface 810 and the output interface 812 can be included in an environment that provides substantially any type of user interface with which a user can interact. Examples of user interface types include graphical user interfaces, natural user interfaces, and so forth. For instance, a graphical user interface may accept input from a user employing input device(s) such as a keyboard, mouse, remote control, or the like and provide output on an output device such as a display. Further, a natural user interface may enable a user to interact with the computing device 800 in a manner free from constraints imposed by input device such as keyboards, mice, remote controls, and the like. Rather, a natural user interface can rely on speech recognition, touch and stylus recognition, gesture recognition both on screen and adjacent to the screen, air gestures, head and eye tracking, voice and speech, vision, touch, gestures, machine intelligence, and so forth.

Additionally, while illustrated as a single system, it is to be understood that the computing device 800 may be a distributed system. Thus, for instance, several devices may be in communication by way of a network connection and may collectively perform tasks described as being performed by the computing device 800.

Various functions described herein can be implemented in hardware, software, or any combination thereof. If implemented in software, the functions can be stored on or transmitted over as one or more instructions or code on a computer-readable medium. Computer-readable media includes computer-readable storage media. A computer-readable storage media can be any available storage media that can be accessed by a computer. By way of example, and not limitation, such computer-readable storage media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, include compact disc (CD), laser disc, optical disc, digital versatile disc (DVD), floppy disk, and Blu-ray disc (BD), where disks usually reproduce data magnetically and discs usually reproduce data optically with lasers. Further, a propagated signal is not included within the scope of computer-readable storage media. Computer-readable media also includes communication media including any medium that facilitates transfer of a computer program from one place to another. A connection, for instance, can be a communication medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio and microwave are included in the definition of communication medium. Combinations of the above should also be included within the scope of computer-readable media.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

What has been described above includes examples of one or more embodiments. It is, of course, not possible to describe every conceivable modification and alteration of the above devices or methodologies for purposes of describing the aforementioned aspects, but one of ordinary skill in the art can recognize that many further modifications and permutations of various aspects are possible. Accordingly, the described aspects are intended to embrace all such alterations, modifications, and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

The invention claimed is:

1. A method of authenticating an integrated circuit, comprising:

reading an authentication code generated by a circuit of the integrated circuit being authenticated;

determining, based upon the authentication code and a blockchain ledger, whether the integrated circuit is an authentic integrated circuit, wherein at least a portion of the blockchain ledger is generated during manufacturing of the integrated circuit including the code generation circuit based upon the authentication code; and responsive to determining whether the integrated circuit is an authentic integrated circuit, outputting an indication whether the integrated circuit is an authentic integrated circuit.

2. The method of claim 1,
wherein the blockchain ledger includes a first block and a second block, the second block coming after the first block in a sequence of blocks; and
wherein determining whether the integrated circuit is an authentic integrated circuit is based upon the first block and the second block.

3. The method of claim 2, wherein determining whether the integrated circuit is an authentic integrated circuit includes determining whether a transaction included in the second block is a valid output of a cryptographic function evaluated over the authentication code and data included in the first block.

4. The method of claim 1,
wherein the code generation circuit generates the authenticate code in response to receiving a request signal.

5. The method of claim 4,
wherein the code generation circuit includes a physical unclonable function (PUF) circuit; and
wherein reading the authentication code includes:
providing a challenge signal to the PUF circuit; and
receiving the signal from the PUF circuit in response to providing the challenge signal to the PUF circuit.

6. The method of claim 1,
including reading an authentication code generated by a circuit of be integrated circuit being authenticated using one of a radio frequency (RF) signal, a magnetic signal, and an optical signal generated by the intergrated circuit being authenticated.

7. The method of claim 1, wherein the authentication code includes at least a portion of a block of the blockchain ledger.

8. The method of claim 1, further comprising:
reading a second authentication code from a second authentication element included in or on the integrated circuit;
determining, based upon the authentication code, the second authentication code, and the blockchain ledger, whether the integrated circuit is authentic; and
responsive to determining whether the integrated circuit is an authentic integrated circuit, outputting an indication whether the integrated circuit is an authentic integrated circuit.

9. The method of claim 8, wherein determining whether the integrated circuit is authentic includes determining whether the second authentication code is the authentication code of the integrated circuit based upon the blockchain ledger.

10. The method of claim 1,
wherein the code generation circuit is a part of a functional portion of the integrated circuit.

11. The method of claim 1, wherein the integrated circuit is an integrated circuit chip, the IC chip including the integrated circuit.

12. A method comprising:
fabricating an integrated circuit such that the integrated circuit includes a circuit that generates an authentication code;
generating a block of a blockchain ledger based upon the authentication code and a cryptographic function; and
storing the block as part of the blockchain ledger in a data store, wherein the blockchain ledger is usable to authenticate the integrated circuit subsequent to the integrated circuit being fabricated.

13. The method of claim 12, wherein the integrated circuit is a first integrated circuit and the block is a first block, the method further comprising:
fabricating a second integrated circuit such that the second integrated circuit includes a circuit that generates a second authentication code;
generating a second block of the blockchain ledger based upon the second authentication code and the cryptographic function; and
storing the second block as part of the blockchain ledger in the data store, wherein the blockchain ledger is usable to authenticate the second integrated circuit subsequent to the second integrated circuit being fabricated.

14. The method of claim 13, wherein generating the second block is based further upon the first block.

15. The method of claim 12, wherein fabricating the integrated circuit includes forming the code generation circuit so its generating the authenticate code in response to receiving a request signal.

16. The method of claim 15, wherein the code generation circuit is a part of a functional portion of the integrated circuit.

17. The method of claim 12,
wherein fabricating the integrated circuit so the authentication code generated by the code generation circuit is read by one of a radio frequency (RF) signal, a magnetic signal, and an optical signal generated by the integrated circuit being authenticated.

18. The method of claim 12,
wherein the electrical code generation circuit includes a physical unclonable function (PUF); and
wherein the PUF is configured to output the signal responsive to receipt of an input signal to the PUF.

19. The method of claim 12, wherein fabricating the integrated circuit so the authentication code generated by the code generation circuit is read by a RE signal generated by the integrated circuit being authenticated.

20. The method of claim 12, wherein the integrated circuit is an integrated circuit (IC) chip, the IC chip including the integrated circuit.

* * * * *